United States Patent [19]

Franklin

[11] Patent Number: 4,616,487
[45] Date of Patent: Oct. 14, 1986

[54] LOW ENERGY CONSUMPTION AIR CONDITIONING SYSTEM

[76] Inventor: William N. Franklin, 6003 Greentree Rd., Bethesda, Md. 20817

[21] Appl. No.: 768,760

[22] Filed: Aug. 23, 1985

[51] Int. Cl.[4] .................................................. F25B 27/00
[52] U.S. Cl. .................................. 62/235.1; 126/417; 126/438
[58] Field of Search .......................... 62/235.1, 324.1; 237/2 B; 126/417, 438

Primary Examiner—Henry Bennett
Attorney, Agent, or Firm—Wegner & Bretschneider

[57] ABSTRACT

A system for conditioning the air in a building which is inexpensive and economical to operate. The air is conditioned in three stages. First, the air passes through a water evaporator. Second, the air passes through a subterranean conduit to exchange heat with the ground. Third, the air passes through a refrigerant evaporator. A solar collector having reflectors to concentrate and direct the solar energy at a heat exchange coil is provided. A heat exchange oil is circulated through the coil. The refrigerant from the refrigerant evaporator passes through two stages of heat exchange. In the first stage, there is heat exchange with the water coming from the water evaporator. In the second stage, there is heat exchange with the oil coming from the solar collector.

12 Claims, 7 Drawing Figures

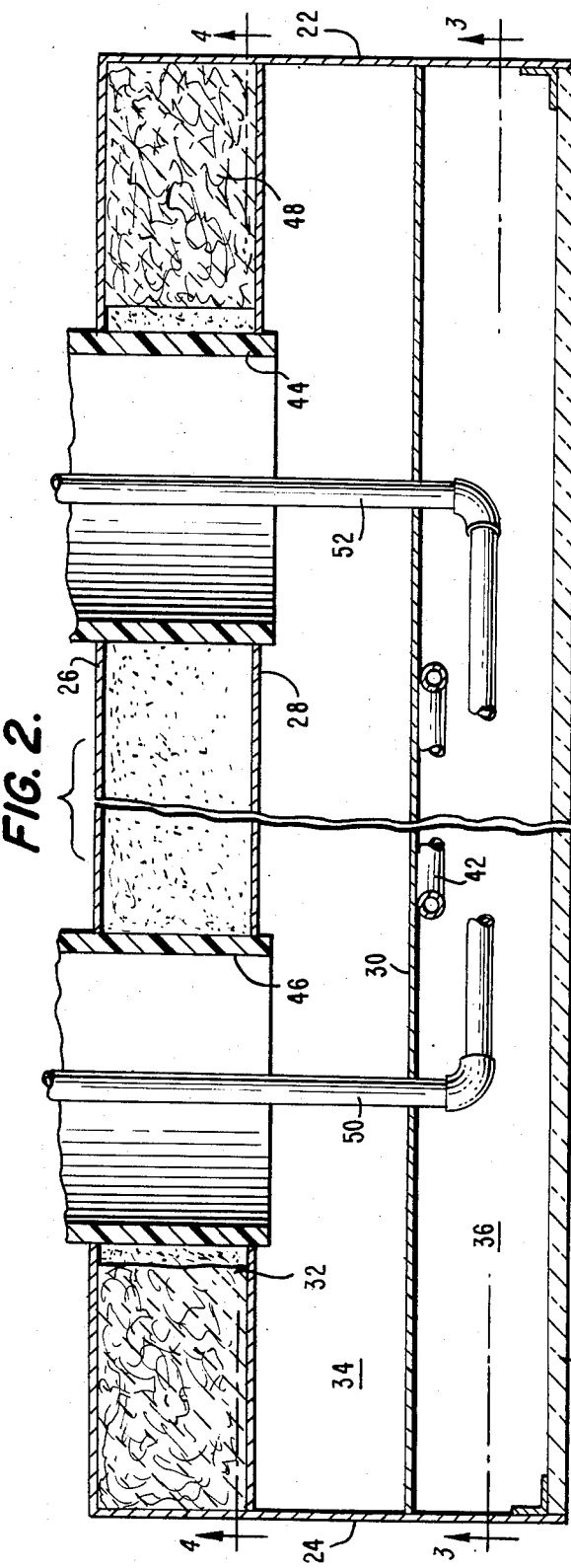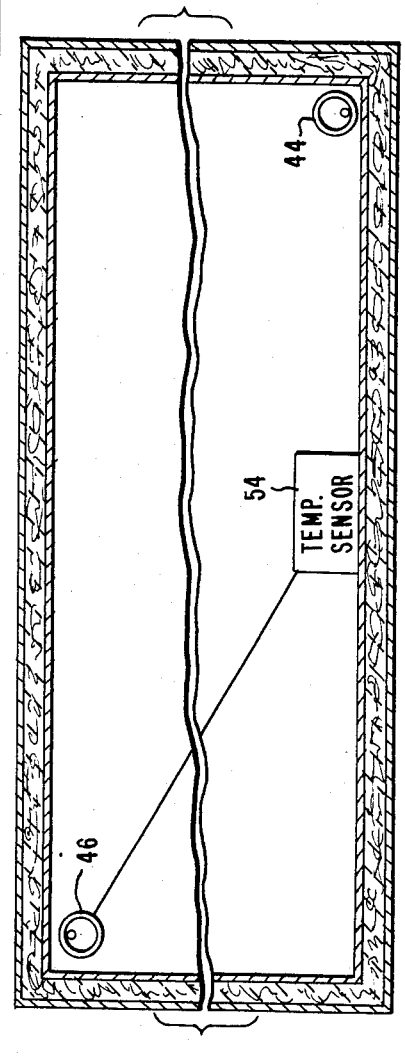

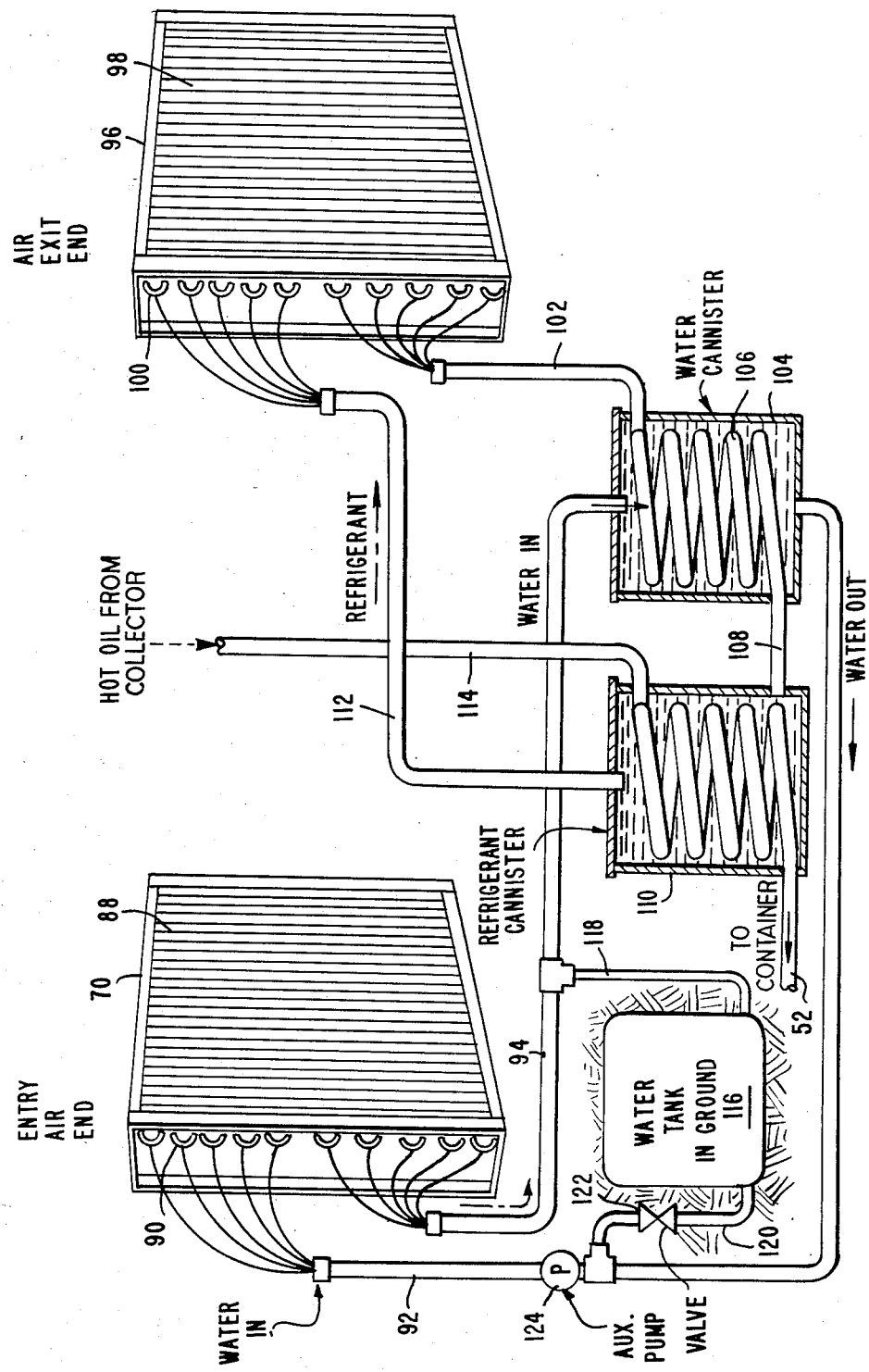

LOW ENERGY CONSUMPTION AIR CONDITIONING SYSTEM

BACKGROUND OF THE INVENTION

This invention relates to energy conservation and, more particularly, this invention relates to a system for conditioning the air in a building in an efficient and economical manner.

Conventional devices for heating and cooling the interior of buildings rely heavily on the use of energy derived from fossil fuel. Heating systems rely, either directly or indirectly on the combustion of such fossil fuels as oil and gas. Similarly, cooling systems indirectly rely, almost exclusively, on the combustion of fossil fuels. Those heating or cooling units which do not, themselves, burn oil or gas, are powered by electricity which, in turn, is generated by the combustion of oil, gas, or coal. With the ever-diminishing supplies of fossil fuels on this planet Earth, the cost of producing the energy has risen dramatically. At the same time, the finite resources of fossil fuels are rapidly becoming depleted.

Yet, there is an abundance of energy derived from the sun which is being totally wasted. Present technology for harnessing solar energy is expensive and inefficient.

Various devices for utilizing solar energy to heat a fluid which is to be used at a location remote from the solar energy collector are known in the art. As representative of the prior art devices are those disclosed by Rountree in U.S. Pat. No. 1,003,514, dated Sept. 19, 1911; by Nichols in U.S. Pat. No. 1,047,554, dated Dec. 17, 1912; and by Chevalier in U.S. Pat. No. 3,968,652, dated Jul. 13, 1976. There are many and varied devices for capturing and utilizing solar energy, as represented by the devices disclosed in the aforementioned U.S. patents. There are, additionally, means for increasing the efficiency of these solar energy devices which are, inherently, inefficient, being limited by the physical surface area provided for collecting the sun's rays. Quite often, these efficiency-increasing means are in the form of reflectors for assisting in collecting and directing the rays of the sun to a particular location. These means are exemplified by Daymon in U.S. Pat. Nos. 3,028,856, dated Apr. 10, 1962; and by Clevett et al. in 4,446,854, dated May 8, 1984.

Moreover, since conditioning the air in a building is essentially a heat exchange process, it follows that it can be made more efficient and economical by taking advantage of other naturally occurring phenomena. For instance, it is known that the temperature of the ground, below a certain depth depending on the latitude of a particular location, is essentially constant at about 50° F. Thus, it should be possible to take advantage of the temperature gradient between the ambient air and the ground at that depth. An early attempt at taking advantage of the cool temperature below ground was made by Frick in U.S. Pat. No. 165,486, dated July 13, 1875. Frick relied on the natural generation of convection currents to carry cool air from the ground, through duct work, into a building. In U.S. Pat. No. 2,217,190, granted to Urquhart on Oct. 8, 1940, a complicated system of conduits is disclosed for transferring air from an underground vault having porous walls to a building. In U.S. Pat. No. 2,793,509, granted to Keen on May 28, 1957, there is disclosed another complex system of buried conduits, each having an inlet end opened above ground and an outlet end connected to a manifold which, in turn, is connected to the inlet end of a fan thereby causing outside air to be drawn into the conduits, passing underground, and then passing into a building. U.S. Pat. Nos. 4,279,291 and 4,449,572, both in the name of Lambert, disclose a system to be used in conjunction with a heat pump. The Lambert system essentially comprises a buried U-shaped conduit through which air is passed before going to the heat pump. A complicated cross-over conduit arrangement is provided to cause recirculation of a portion of the air. Another complicated buried heat exchange system is disclosed in U.S. Pat. No. 4,388,966, granted to Spiegel on June 21, 1983.

To the best of the present Applicant's knowledge, however, there has not been a system for conditioning air in a building which utilizes a combination of elements taking advantage of both solar energy and other natural energy sources, and which is simple and economical.

SUMMARY OF THE INVENTION

It is, therefore, a primary object of the present invention to provide a system for conditioning the air in a building which is economical to operate and relies on very few moving parts.

It is another object of the present invention to provide a system for conditioning the air in a building which takes advantage of both solar energy and other natural heat exchange sources.

It is a further object of the present invention to provide a system for conditioning the air in a building which is easy to install, either in new building construction or as an addition to an existing building, without extensive excavation.

Consistent with the foregoing objects, the system of the present invention comprises, in combination, solar energy collection means which includes a circulating heat exchange oil; first means for exchanging heat with the air of the building comprising a water evaporator through which the air passes; second means for exchanging heat with the air comprising subterranean conduit means which is disposed at a sufficient depth that the temperature around it is substantially constant; third means for exchanging heat with the air comprising a refrigerant evaporator through which the air passes; and secondary heat exchange means for exchanging heat between the various heat exchange fluids. The secondary heat exchange means comprises first secondary means for exchanging heat between the water of the water evaporator and the refrigerant of the refrigerant evaporator; and second secondary means for exchanging heat between the refrigerant and the oil. Blower means are provided for forcing air seriatim through the first heat exchange means, the second heat exchange means, and the third heat exchange means. The solar energy collection means includes reflectors to reflect and direct the solar energy into the enclosure where the heat exchange oil circulates through a coil.

BRIEF DESCRIPTION OF THE DRAWINGS

The invention will be better understood, and objects other than those set forth above will become apparent, when consideration is given to the following detailed description thereof. Such description makes reference to the annexed drawings wherein:

FIG. 2 is a cross-sectional view taken on the line 2—2 of FIG. 1;

FIG. 4 is a cross-sectional view taken on the line 4—4 of FIG. 2;

FIG. 7 is a schematic view, partly in perspective and partly in cross-section, showing the system of the invention.

DETAILED DESCRIPTION OF THE PREFERRED EMBODIMENTS

Figure 1:
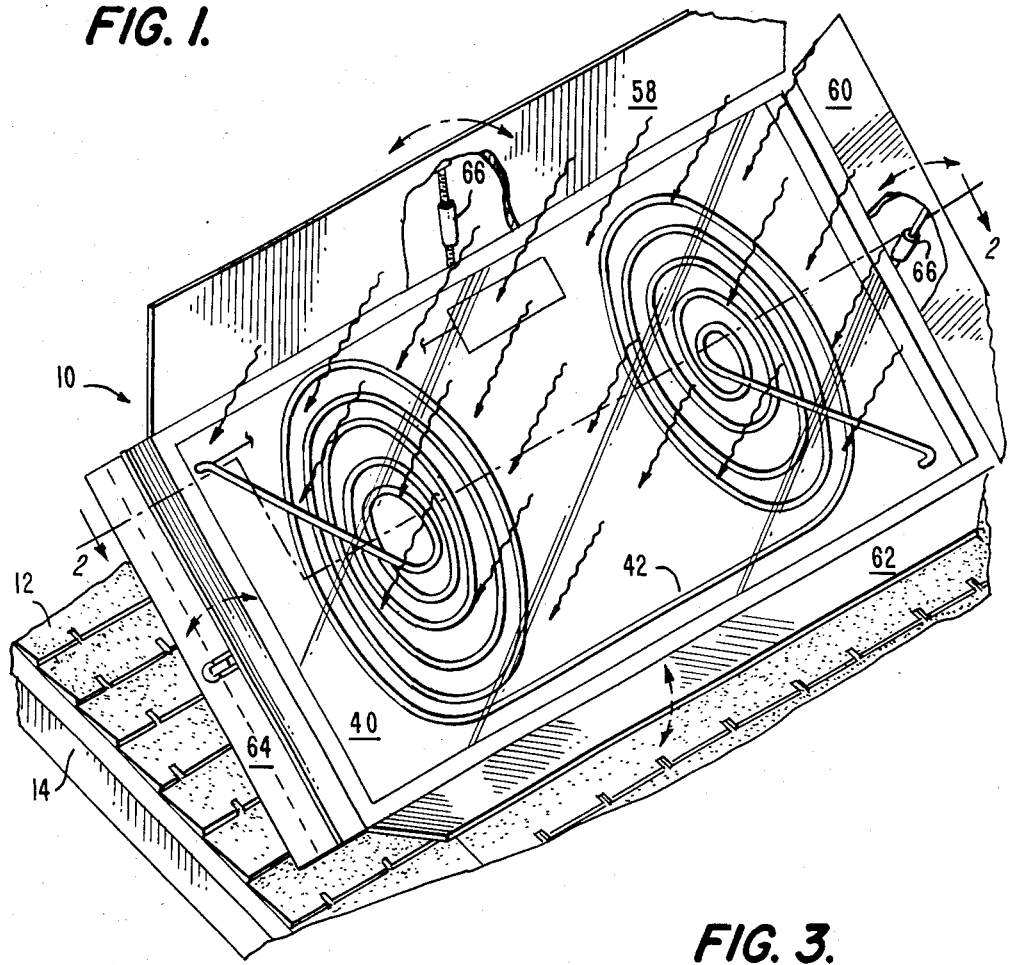
FIG. 1 is a perspective view, partly broken away for illustrative clarity, of the solar energy collection means used in the inventive system.
Figure 3:
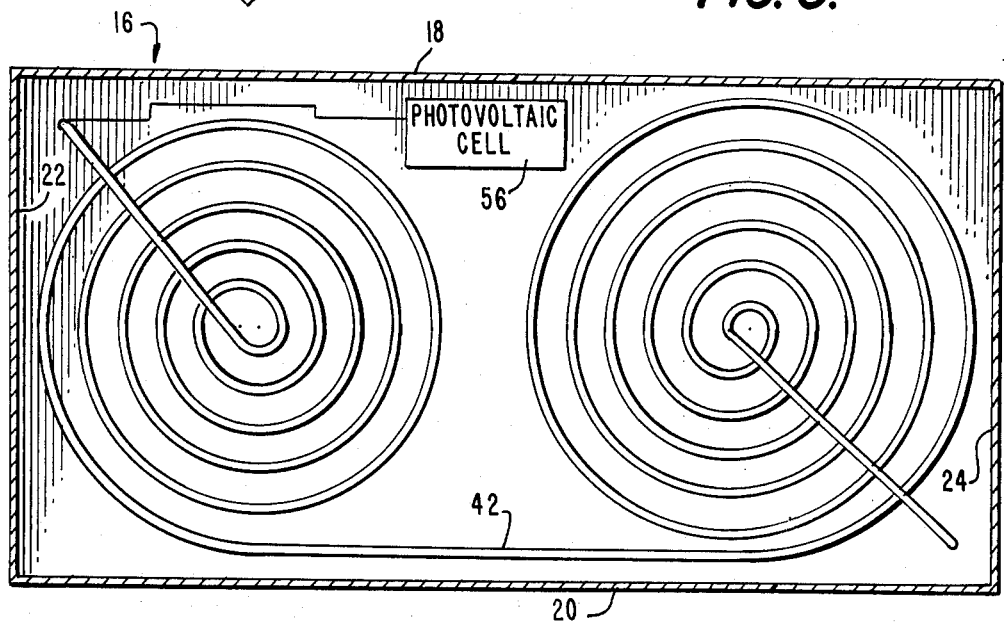
FIG. 3 is a cross-sectional view taken on the line 3—3 of FIG. 2.

Referring first to FIGS. 1-4, there will be seen the first major component of the instant inventive system, the solar energy collector generally designated by the numeral 10. The solar energy collector 10 is preferably mounted on the roof 12 of a building 14 although, for esthetic reasons, it may be preferred to mount it elsewhere in the vicinity of the building. The choice of a location is well within the skill of the art, the determining factor generally being the ready availability of unobstructed sunlight. The solar energy collector 10 generally comprises an enclosure 16 having side walls 18 and 20 and end walls 22 and 24, and bottom wall 26. Partitions 28 and 30 divide the enclosure 16 into three compartments 32, 34, and 36. Compartment 36 is covered over by a glass plate 40 which is made of a suitable glass known in the art such as a tempered glass having a low iron content thereby having excellent heat transmissivity and low emissivity. The glass 40 is suitably mounted on enclosure 16 to form sealed compartment 36.

A continuous heat exchange coil 42 is disposed in upper air chamber 36. A heat exchange fluid in the form of an oil is continuously circulated through heat exchange coil 42. The intermediate compartment 34 is a sealed air chamber and has a pair of air ducts 44 and 46 extending outwardly therefrom through the lower chamber 32. During winter months, ducts 44 and 46 and chamber 34 are used to assist in heating the building by passing relatively cool air from the building into chamber 34 through duct 46 where it is heated by the sun and passed back out to the building through duct 44. Lower chamber 32 is packed with a suitable insulation 48 to increase year-round efficiency of both the hot oil and the hot air collection. The oil is circulated to coil 42 through inlet 50 and out of coil 42 through outlet 52. In addition, a temperature sensor 54 is provided to actuate an on-off switch connected to a fan (not shown) to regulate the flow of air through conduit 46, chamber 34, and conduit 44. A photovoltaic cell 56 is provided to power the fan.

In order to assist in collecting and directing the rays of the sun into enclosure 16, reflectors 58, 60, 62, and 64 are provided. These reflectors are adjustable by any means known in the art, adjustable braces 66 being shown merely as exemplary such means. The reflectors can be pre-set to the desired position by the installer, they can be manually adjusted by the owner of the building occasionally to compensate for the changes in climate from season-to-season, or they can be provided with automatic adjusting means, all of which are well-known in the art. The collector 10 is shown somewhat out of proportion to the reflectors 58, 60, 62, and 64 for illustrative clarity. In practice, the reflectors are substantially larger depending on the physical constraints of the environment where the unit is mounted. The reflectors are made as large as is practically possible. The reflectors 58, 60, 62, and 64 are shown as being planar but they are preferably windfoil shaped in a cross-section, that is, the reflecting face is planar but the rear is curved to provide minimal resistance to the wind.

Figure 5:
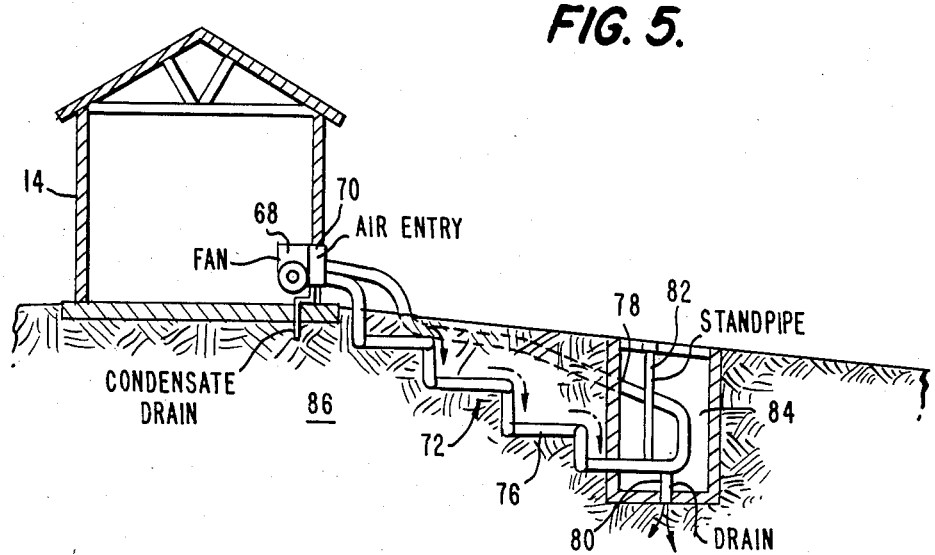
FIG. 5 is an elevational view of the subterranean conduit system with the building being shown in cross-section.

That part of the system which directly treats the air will now be described and, to that end, attention is directed to FIG. 5 which, partially schematically, shows the building 14 at a suitable location in which is installed a typical blower 68 such as that commonly used in conventional heating and cooling systems. Blower 68 directs the air to be conditioned into the air entry end 70 of the system. The air then passes through a subterranean conduit generally designated by the numeral 72 and then to the air exit end 74 (FIG. 6) of the system. Conduit 72 comprises a first, intake, leg 76 and a second, return, leg 78. The intake leg 76 is preferably stepped as shown in FIG. 5 and, at the lowest part, contains a condensate drain 80. The gradient of the stepped intake leg 76 is exaggerated for illustrative clarity. In addition, a standpipe 82 is provided for inspection and the like. Preferably, a vault 84 is provided at the low end to enable easy maintenance. Conduit 72 is buried at a sufficient depth that the ambient temperature of the ground 86 is substantially constant year-round. This depth may vary according to the geographical location, but it is well-known in the art and can be easily determined. The constant temperature is about 50° F. The air passing through conduit 72 is in a heat exchange relationship with the surrounding ground 86. Thus, in the summer when the air temperature is higher than 50° F., the air is cooled. In the winter when the air temperature is substantially lower (depending on the geographical location), the air might be warmed by the ground.

Turning now to FIG. 7, the air entry end 70 of the system is essentially an evaporator 88 through which water is circulated. Depending on the climate indigenous to the installation, evaporator 88 can take one of two forms. In an area where the climate is generally humid, evaporator 88 includes a direct expansion coil 90 through which the water flows. The coil conventionally is constructed of copper tubing or any other suitable metal supported on metal support sheets and with fins of aluminum or any other suitable metal to increase heat transfer efficiency. The construction of the evaporator is well-known in the art and need not, therefore, be further described. Water flows into coils 90 from conduit 92 and flows out of coils 90 into conduit 94. The air flowing through evaporator 88 is, therefore, cooled by contact with the coils and fins which are at a lower temperature than the air. At the same time, a certain amount of dehumidification occurs. This air which has been cooled in the first stage then passes to conduit 72 for second stage cooling and dehumidification.

In a climate which is generally hot and dry, instead of expansion coil 90, there is provided a system of plastic and/or redwood evaporator pads over which the water is circulated. Air forced through the evaporator 88 by fan 68 is then cooled by evaporation and, at the same time, picks up moisture before passing to conduit 72.

Because the air has a higher relative humidity, it gives up BTU's more readily.

The air, after passing through the conduit, reaches the exit end 96 of the system before being directed to the interior of the building through conventional duct work, or the like. Exit end 96 is a conventional refrigerant evaporator 98. A standard refrigerant which is ordinarily in a gaseous form such as the fluorocarbons (the commonest of which is known as Freon), or their art-recognized equivalents is circulated through coil 100.

The typical prior art air conditioner that uses a fluorocarbon, or the like, refrigerant, comprises an evaporator located inside the building and a compressor located at or above ground level outside the building. Refrigerant compressors use large motors and consume large amounts of electricity. In the instant system, however, no compressor is used. Instead, refrigerant flowing out of evaporator 98 through conduit 102 passes to a heat exchanger 104 where it circulates through coil 106 and out through conduit 108. Water passes into heat exchanger 104 through conduit 94 and exits through conduit 92. Thus, there is heat transfer between the refrigerant and the water in a first stage in heat exchanger 104. The refrigerant then passes to heat exchanger 110 from conduit 108 and then, through conduit 112, back to the coil 100 of evaporator 98. Oil from collector 10 passes into heat exchanger 110 by way of conduit 52 and out through conduit 114.

In a preferred embodiment, a water tank 116 is buried in the ground and a bleed line 118 from conduit 94 passes water thereto. Water leaves tank 116 through conduit 120 and, after passing through valve 122, enters conduit 92. By regulating the flow from tank 116 with valve 122, relatively warmer water can be bled from conduit 94 and relatively cooler water added to the system from tank 116. In any event, an auxiliary pump 124 is provided to pump the water through the system.

Figure 6:
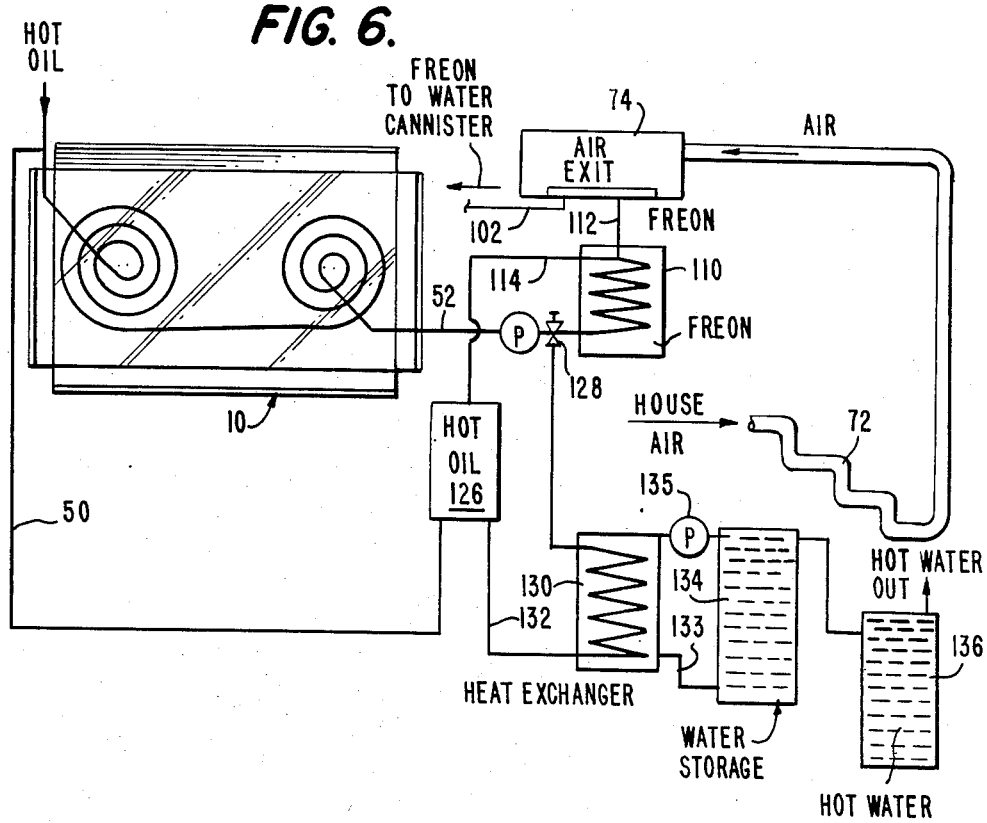
FIG. 6 is a schematic view showing one embodiment of the inventive system.

Referring to FIG. 6, another preferred embodiment can be seen. Oil leaving heat exchanger 110 through conduit 114 is passed to a reservoir or accumulator 126 from which it is supplied to the solar collector 10 through conduit 50.

In an additional embodiment, oil leaving solar collector 10 can be used to heat water for use in the building. In this embodiment, valve 128 is provided in line 52 to divert all or some of the hot oil to heat exchanger 130. The oil leaving heat exchanger 130 passes to accumulator 126 through conduit 132. Cold water is provided for heat exchanger 130 from source 134 through conduit 133. The hot water from heat exchanger 130 passes to tank 136 through pump 135. A temperature gradient is formed in tank 134 with the colder water at the bottom and the warmer water at the top. The hot water passes from tank 134 to a conventional storage tank 136. Alternatively, the water provided to heat exchanger 130 could be bled from line 92 or 94. Pump 135 is operated responsive to temperature to insure that the water in heat exchanger 130 does not become too hot.

It should be apparent from the foregoing detailed description that the objected set forth at the outset to the specification have been successfully achieved. Moreover, while there is shown and described present preferred embodiments of the invention, it is to be distinctly understood that the invention is not limited thereto, but may be otherwise variously embodied and practiced within the scope of the following claims.

What is claimed is:

1. A system which utilizes solar energy for conditioning air in a building comprising, in combination:
    (A) solar energy collection means which comprises:
        (1) an enclosure having a bottom and side and end walls,
        (2) a continuous hollow heat exchange coil having an inlet end and an outlet end,
        (3) heat exchange oil circulating through said coil, and
        (4) adjustable reflectors for reflecting and concentrating solar energy into said enclosure;
    (B) first means for exchanging heat with said air comprising:
        (1) a water evaporator having a water inlet, means for circulating water through said evaporator, a water outlet, means for effecting heat exchange between air flowing therethrough and said water, an air inlet end, and an air outlet end,
        (2) closed circuit recirculating means for supplying water to said water inlet and receiving water from said water outlet;
    (C) second means for exchanging heat with said air comprising subterranean conduit means having an inlet end connected to said air outlet end of said water evaporator, and an outlet end, and disposed at a sufficient depth such that the ambient temperature is substantially constant, whereby air flowing through said conduit exchanges heat with the surrounding ground;
    (D) third means for exchanging heat with said air comprising a refrigerant evaporator having a refrigerant inlet, a refrigerant outlet, a heat exchange coil between said refrigerant inlet and outlet, an air inlet connected to said outlet end of said conduit means, and an air outlet end from which conditioned air exits to said building;
    (E) secondary heat exchange means comprising:
        (1) first secondary means for exchanging heat between said water and said refrigerant having a refrigerant inlet connected to said refrigerant outlet of said refrigerant evaporator, and a refrigerant outlet, and disposed in said closed circuit water recirculating means,
        (2) second secondary means for exchanging heat between said refrigerant and said oil having a refrigerant inlet end connected to said refrigerant outlet of said first secondary heat exchange means, a refrigerant outlet end connected to said refrigerant inlet of said refrigerant evaporator, an oil inlet end connected to said outlet end of said solar collection means coil, and an oil outlet end connected to said inlet end of said solar collection means coil; and
    (F) blower means for forcing air seriatim through said first heat exchange means, said second heat exchange means, and said third heat exchange means.

2. A system as defined in claim 1, further comprising a fan disposed in said building for exhausting hot air therefrom, said solar energy collection means further including a photovoltaic cell to power said fan, a temperature sensor, and a switch responsive to said sensor to control said fan.

3. A system as defined in claim 1, wherein said enclosure of said solar energy collection means further comprises a glass top wall, a pair of partitions dividing said enclosure into three chambers, the lowermost of said chambers having insulation therein, the middle one of said chambers being a sealed air chamber, and the uppermost of said chambers being a sealed air chamber with said coil being disposed therein, a cool air inlet pipe and a hot air outlet pipe extending through said lowermost chamber to communicate said middle chamber with the interior of said buildings.

4. A system as defined in claim 1, wherein said subterranean conduit means includes at least one water condensate drain.

5. A system as defined in claim 1, wherein said subterranean conduit means is stepped downwardly from the inlet end thereof.

6. A system as defined in claim 1, further comprising a pump for causing said oil to circulate in said system.

7. A system as defined in claim 1, further comprising a water heater which includes heat exchange means for passing heated oil therethrough from said solar energy collection means to heat said water, and valve means to selectively pass said heated oil to at least one of said second secondary heat exchange means and said water heater.

8. A system as defined in claim 1, further comprising an oil reservoir disposed between said solar energy collection means and said second secondary heat exchange means.

9. A system as defined in claim 1, further comprising a pump interposed in said closed circuit water recirculating means.

10. A system as defined in claim 1, further comprising a water storage tank buried in the ground and forming a bleed circuit in said closed circuit water recirculating means in parallel with said first secondary heat exchange means, and valve means to selectively allow water to pass into and out of said tank.

11. A system as defined in claim 1, wherein said means for circulating water through said water evaporator is an evaporator coil.

12. A system as defined in claim 1, wherein said means for circulating water through said water evaporator is gravity water drip means and collector means, and said means for effecting heat exchange is water evaporation pads.

* * * * *